United States Patent Office 3,265,947
Patented August 9, 1966

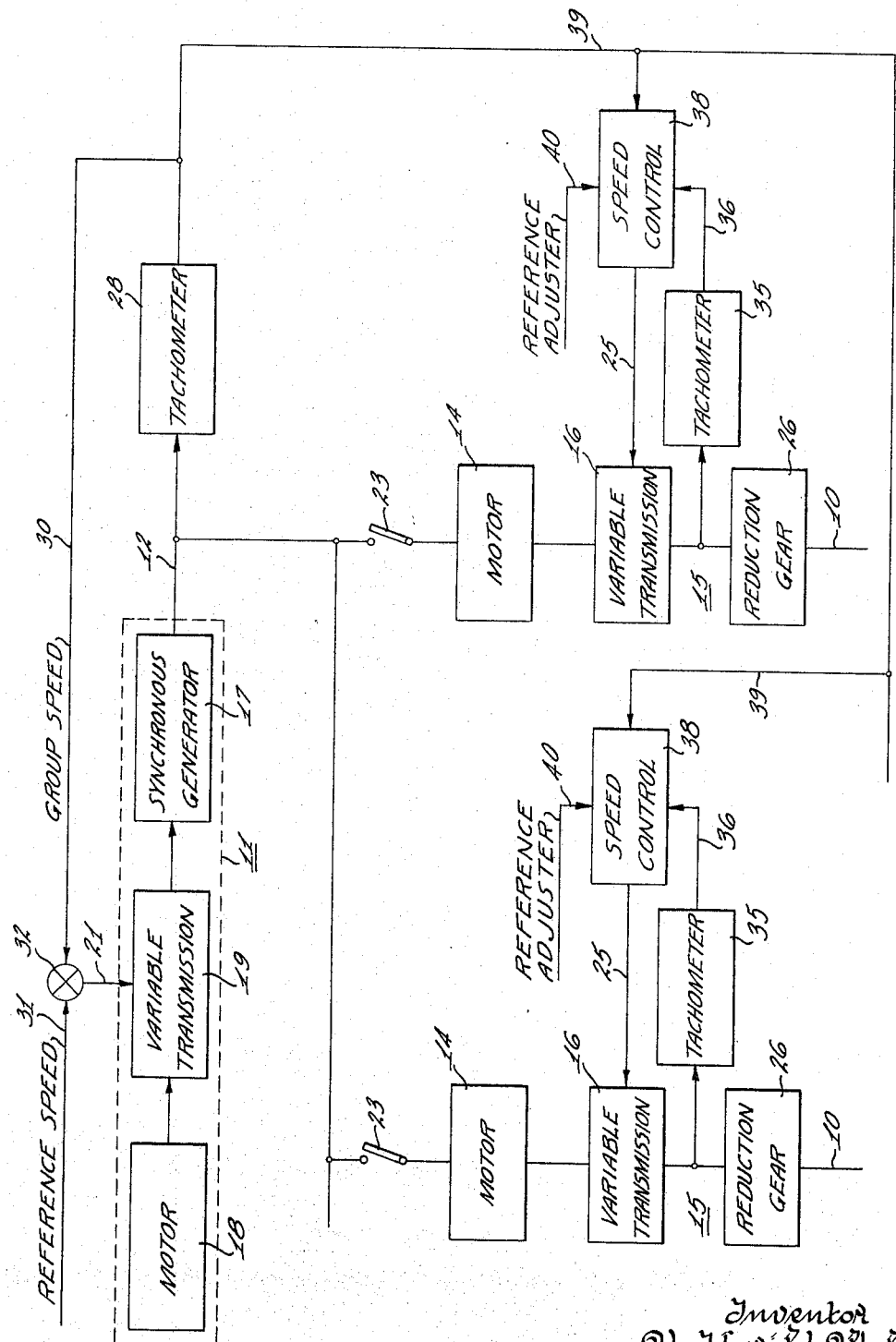

3,265,947
PLURAL MOTOR GENERATOR-FED DRIVE CONTROL WITH VARIABLE CONTROL BETWEEN EACH DRIVE
Vernon Harold Woehler, Appleton, Wis., assignor, by mesne assignments, to Allis-Chalmers Manufacturing Company, Milwaukee, Wis.
Filed Apr. 4, 1963, Ser. No. 270,627
2 Claims. (Cl. 318—59)

This invention relates in general to a system of motors and associated equipment that drive a group of related rotating elements. More specifically this invention relates to a variable speed drive that is particularly intended for a web conditioning machine such as a paper machine.

A paper machine has a number of rotating elements, such as rolls and presses that advance the paper web through various stages in the paper making process. Since the material should advance through all sections of the machine at very nearly the same linear speed, the rotating elements should have the same surface speed and related rotational speeds. To control the weight of the paper, the speed of the rotating elements is varied as a group so as to maintain the relative rotational speed between the elements. This rotational speed of the elements and the motors will be called the "group speed." Another operation that calls for varying the group speed is starting up the machine by gradually increasing the speed of all the rotating elements.

For various reasons the individual speeds of some elements of the machine should be made to deviate from the group speed. For example, the relative speeds may be changed to vary the tension on the web.

The prior art has suggested three types of drives to meet these and other requirements. One well known drive has a single motor that drives the elements of the paper machine through power transmitting shafts and belts. One problem of this drive is that it requires more space than other available drives.

Another drive uses a direct current motor for each rotating element of the machine. Although these motors require only little space and are adaptable to flexible speed control, the system is relatively expensive, and the brushes of the direct current motors require maintenance. In a third system, an alternating current motor such as an induction motor drives each rotating element of the machine through a variable transmission. Although alternating current drives have important advantages over other drives, alternating current drives of the prior art have been relatively inflexible and costly as compared with the other drives.

The alternating current drive of this invention includes a source of variable frequency electrical power and a group of alternating current motors that are energized by the variable frequency source and run at a group speed that corresponds to the frequency of the source. The source frequency is controllable to vary the group speed. A variable transmission connects each motor to its associated element of the machine to vary the speed of selected elements of the machine from the group speed.

One object of this invention is to provide a new and improved alternating current motor drive.

Another object of this invention is to provide a new and improved alternating current motor drive for a paper machine.

Another object of this invention is to provide a new and improved variable speed drive in which the speed of a group of motors can be varied individually and as a group.

The drawing and the following description of the invention will suggest other objects and advantages of the invention.

The drawing is a block diagram of the variable speed drive of this invention. Lines connecting the blocks represent the flow of control signals and power and also represent the physical apparatus for transmitting the signals and power.

The embodiment of the motor drive that is shown in the drawing is particularly intended for driving the rotating elements of a paper machine. Shafts 10 connect these elements of the paper machine to the drive.

The motor drive of this invention comprises the following elements and their electrical and mechanical connections:

(1) A source 11 of variable frequency electrical power 12,
(2) A group of alternating current motors 14,
(3) Means 15 including a variable transmission 16 connecting each motor 14 to drive a shaft 10, and
(4) A control, which will be described in detail later.

Variable frequency source 11 preferably includes a three phase synchronous generator 17, a synchronous motor 18, and a variable transmission 19 that connects the motor to drive the generator at a selected speed. Motor 18 is electrically connected to be energized by a three phase source of electrical power to run at substantially a constant speed. Variable transmission 19 is preferably an eddy current clutch. As is well known, the eddy current clutch has a rotatably driven input member and a rotating output member that are variably coupled by means of a magnetic field structure. The magnetic field structure is energized according to a speed control signal 21 (described later).

Synchronous motor 18 and variable transmission 19 form a source of rotational mechanical power that is variable in response to group speed control signal 21. Numerous equivalents of such a source, such as a variable speed steam turbine, are well known.

Motors 14 may be any type of frequency responsive electrical motor that is suitable for the paper machine. Preferably, the motors are three phase synchronous motors or reluctance motors and the speed of each motor corresponds to the frequency of the electrical power 12. Motors 14 may be induction motors, and their speed will follow the frequency of the variable source 11 but will be somewhat less than synchronous speed. In either case, the synchronous speed will be called the group speed. A switch 23 connects each motor 14 to be energized by the variable frequency source 12.

Variable transmission 16 may be an eddy current clutch that responds to a signal 25 (described later). Preferably a reduction gear 26 connects each eddy current clutch 16 to an associated shaft 10 of the paper machine.

The control comprises means for controlling variable frequency source 11 to produce the proper frequency for the selected group speed, and means for controlling each variable transmission 16 to produce selected individual variations from the group speed.

The control for variable frequency source 11 comprises a tachometer 28 that is connected to variable frequency source 11 to produce a group speed signal 30, means for producing a speed reference signal 31 and a comparator 32 that produces the group speed error signal 21. Comparator 32, which may be of any suitable type, preferably varies group speed error signal 21 in magnitude and polarity as the group speed 30 varies with respect to the reference 31.

Tachometer 28 is illustrated as a frequency responsive device that is connected to receive a measure of the electrical output 12 of generator 17. The tachometer may comprise a small generator mechanically connected to be driven by generator 17 or by the rotational mechanical power source.

The control for each variable transmission 16 includes a tachometer 35 mechanically connected to respond to the output of the variable transmission 16. Tachometer 35 produces an electrical signal 36 that indicates the speed of the output of variable transmission 16. A device 38 receives speed signal 36 and an electrical reference signal 39 and produces signal 25 that controls variable transmission 16 to maintain a selected relation between the output speed of variable transmission 16 and a reference speed represented by signal 39. A signal 40 controls device 38 to select this relationship. Preferably reference signal 39 is a measure of group speed signal 30. The drawing shows tachometer 28 connected to provide signal 39. Two tachometers may be connected to separately provide the two speed signals 30 and 39.

Device 38 may comprise a potentiometer that receives signal 39 and transmits a selected fraction of this signal and a comparator that compares speed signal 36 with the selected fraction of reference signal 39. Signal 40 represents a mechanical input that varies the position of a movable tap on the potentiometer and thereby establishes the relation between the output speed of variable transmission 16 and the group speed.

To start the paper machine it is preferable to adjust signal 40 to a position to deenergize the eddy current clutches 16 and disconnect motors 14 from shafts 10. Motors 14 may be electrically connected to generator 17 when the generator is at any suitable speed. Preferably the eddy current clutches are not connected to transmit power the machine until the motors are running at their usual operating speed.

As varying requirements for speed occur, speed reference signal 31 may be varied to change the group speed of the motors and the elements of the paper machine. As the group speed changes, reference signal 39 changes and signals variable transmissions 16 to maintain the output speeds of the transmissions at a selected fraction of the group speed. If particular elements of the paper machine require a different speed, individual controls 40 may be adjusted to provide the proper speed.

It is occasionally desirable to reverse the rotation of some of the elements of the paper machine and this can be done by interchanging two of the three connections to the associated motor 14.

The specific embodiment of the invention which has been described will suggest to those skilled in the art variations within the scope of the claims.

Having now particularly described and ascertained the nature of my said invention and the manner in which it is to be performed, I declare that what I claim is:

1. A variable speed drive for a device such as a paper machine having a plurality of rotatable elements, comprising
   means providing a reference indicating a desired group speed for said drive,
   a synchronous generator and means responsive to said reference to drive said generator at a speed that corresponds to said group speed,
   a plurality of frequency responsive motors connected to be energized by said generator,
   variable transmissions connecting said motors to said rotatable elements, and
   speed control means associated with each said variable transmission for controlling said transmission to maintain the output speed of said transmission in a predetermined relation to said group speed and including means for comparing said transmission output speed and said group speed and means for adjusting said speed control means to vary said predetermined relation,
   whereby said rotatable elements can be driven at different speeds which vary from said group speed.

2. A variable speed drive in accordance with claim 1 wherein said speed control means is adjustable to control said variable transmission to disconnect the rotatable element driven thereby from the motor associated with said transmission, whereby said motors can start without load.

References Cited by the Examiner

UNITED STATES PATENTS

| | | | |
|---|---|---|---|
| 1,934,505 | 11/1933 | Kenah | 318—148 |
| 2,077,768 | 4/1937 | Perry | 318—78 X |
| 2,785,363 | 3/1957 | Bohn | 318—78 X |
| 2,864,040 | 12/1958 | Trotsky | 318—99 X |
| 2,943,809 | 7/1960 | Garrett | 310—95 X |
| 3,017,527 | 1/1962 | La Valee | 310—94 |
| 3,076,096 | 2/1963 | Simo | 310—95 X |

FOREIGN PATENTS

| | | |
|---|---|---|
| 517,561 | 10/1955 | Canada. |
| 517,562 | 10/1955 | Canada. |
| 1,103,446 | 3/1961 | Germany. |
| 383,526 | 11/1932 | Great Britain. |

ORIS L. RADER, *Primary Examiner.*

T. LYNCH, *Assistant Examiner.*